(12) United States Patent
Bittar et al.

(10) Patent No.: US 10,234,590 B2
(45) Date of Patent: *Mar. 19, 2019

(54) METHOD AND APPARATUS FOR MAKING RESISTIVITY MEASUREMENTS IN A WELLBORE

(71) Applicant: Halliburton Energy Services, Inc., Houston, TX (US)

(72) Inventors: Michael S. Bittar, Houston, TX (US); Gary Weaver, Conroe, TX (US); Vadim Minosyan, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,263

(22) Filed: Dec. 7, 2017

(65) Prior Publication Data
US 2018/0100946 A1 Apr. 12, 2018

Related U.S. Application Data

(63) Continuation of application No. 13/574,577, filed as application No. PCT/US2010/021723 on Jan. 22, 2010, now Pat. No. 9,857,497.

(51) Int. Cl.
*E21B 10/00* (2006.01)
*E21B 47/01* (2012.01)
(Continued)

(52) U.S. Cl.
CPC ............ *G01V 3/20* (2013.01); *B23P 15/28* (2013.01); *E21B 10/00* (2013.01); *E21B 47/01* (2013.01); *E21B 47/102* (2013.01)

(58) Field of Classification Search
CPC ... G01V 3/30; G01V 3/28; G01V 3/10; G01V 3/18; E21B 47/122; E21B 47/16; G01S 13/885; G01S 7/003
(Continued)

(56) References Cited

U.S. PATENT DOCUMENTS 5,720,355 A * 2/1998 Lamine .................. E21B 10/60
175/27
6,359,438 B1 3/2002 Bittar
(Continued)

FOREIGN PATENT DOCUMENTS

AU 2010343293 B2 9/2014
GB 2489294 A 9/2012
(Continued)

OTHER PUBLICATIONS

"Australian Application Serial No. 2010343293, First Examiner Report dated Jul. 19, 2013", 4 pgs.
(Continued)

*Primary Examiner* — Muhammad N Edun
*Assistant Examiner* — Jerold Murphy
(74) *Attorney, Agent, or Firm* — Gilliam IP PLLC (57) ABSTRACT

A drilling assembly includes a first tubular member supporting a first transmitter antenna and a steering assembly located beneath the first tubular member. The drilling assembly also includes an earth boring device comprising a drill bit. The drill bit has a body member, a bottommost surface and a gage surface at a stabilizing section of the drill bit. The earth boring device is supported beneath the steering assembly. The earth boring device includes a second transmitter/receiver antenna supported in spaced relation to the first transmitter antenna and within 36 inches of the bottommost surface of the drill bit, and at least one electrode generally at an outer surface of the stabilizing section of the drill bit.

12 Claims, 6 Drawing Sheets

(51) Int. Cl.
*E21B 47/10* (2012.01)
*G01V 3/20* (2006.01)
*B23P 15/28* (2006.01)

(58) Field of Classification Search
USPC ............... 367/25–35, 81–85, 86; 175/40–50; 340/853.1–856.4
See application file for complete search history.

(56) References Cited

U.S. PATENT DOCUMENTS

| | | | |
|---|---|---|---|
| 7,063,141 | B2 | 6/2006 | Masak |
| 7,538,555 | B2 | 5/2009 | Banning et al. |
| 9,022,144 | B2* | 5/2015 | Clark ..................... E21B 10/00 175/40 |
| 9,857,497 | B2* | 1/2018 | Bittar ..................... G01V 3/20 |
| 2005/0218898 | A1 | 10/2005 | Fredette et al. |
| 2007/0229304 | A1* | 10/2007 | Hall .......................... E21B 4/14 340/853.1 |
| 2007/0236222 | A1 | 10/2007 | Gorek et al. |
| 2008/0066961 | A1 | 3/2008 | Aivalis et al. |
| 2008/0297161 | A1 | 12/2008 | Gorek |
| 2009/0126150 | A1 | 5/2009 | Tanaya |
| 2009/0205867 | A1 | 8/2009 | Reckmann et al. |

FOREIGN PATENT DOCUMENTS

| | | |
|---|---|---|
| GB | 2535665 B | 10/2016 |
| WO | 2004113674 A1 | 12/2004 |
| WO | 2009126150 A1 | 10/2009 |
| WO | 2011090481 A1 | 7/2011 |

OTHER PUBLICATIONS

"United Kingdom Application Serial No. 1121558.9, Office Action dated Feb. 11, 2016", 2 pgs.

"Australian Application Serial No. 2014233563, First Examiner Report dated Aug. 21, 2015", 4 pgs.

"United Kingdom Application Serial No. 1121558.9, Office Action dated Jun. 15, 2016", 2 pgs.

"Australian Application Serial No. 2016253599; Examination Report dated Mar. 9, 2017", 3 pgs.

"Geo-Pilot Rotary Steerable System", Halliburton. Sperry Drilling Services, Jan. 1, 2009 00:00:00.0, 3 pgs.

"Gulf Cooperation Council Application Serial No. 2011/17620, Office Action dated Aug. 15, 2012", 5 pgs.

"International Application Serial No. PCT/US2010/021723, Search Report dated Mar. 23, 2010", 4 pgs.

"International Application Serial No. PCT/US2010/021723, Written Opinion dated Mar. 23, 2010", 10 pgs.

"International Application Serial No. PCT/US2010/21723, International Preliminary Report on Patentability dated Mar. 5, 2012", 6 pgs.

"Malaysian Patent Application No. PI 2011005893, Examination Report dated Oct. 15, 2015", 4 pgs.

"United Kingdom Application Serial No. 1608378.4, Office Action dated Jun. 15, 2016", 4 pgs.

* cited by examiner

METHOD AND APPARATUS FOR MAKING RESISTIVITY MEASUREMENTS IN A WELLBORE

BACKGROUND OF THE INVENTION

The present invention relates generally to methods and apparatus for making resistivity measurements in a wellbore, and more particularly relates to such methods and apparatus for making resistivity measurements proximate a drill bit, such as in a logging while drilling or measurement while drilling environment. Such resistivity measurements proximate the drill bit may be used for various types of analysis, including in some instances imaging of the formation and geosteering of the drilling operation.

As is well known, resistivity measurements may be used both to evaluate formation properties, and to identify bed boundaries to assist in steering of a drilling operation. In trying to evaluate formation properties, one problem that is faced is measurement errors resulting from fluid invasion of the drilling mud and associated filtrate into the formation. As this invasion surrounding the wellbore is a function of several factors, including time, it would be desirable to measure resistivity at the drill bit to minimize the time component of the formation invasion.

Because of factors such as the above, the desirability of making resistivity measurements at, or ahead of, the drill bit during a drilling operation has been proposed. However, the actual construction and configuration of a bottom hole assembly, including a drill bit, to facilitate those resistivity measurements presents substantial challenges. These challenges include how to provide electrical communication to and from components in the drill bit, particularly in a configuration that is suitable for the realities of drilling operations, and particularly in systems wherein geosteering mechanisms are employed. Other challenges include how to configure the sensors to obtain the highest quality measurements at the drill bit; how to include the necessary functionality in the drill bit in a manner which is cost-effective; as well as additional challenges. Thus, notwithstanding recognized benefits to making such measurements at the drill bit, limited practical configurations have been proposed to make those measurements.

Accordingly, it would be desirable to have a practical bottom hole assembly, and an included drill bit, that enables the taking of resistivity measurements at or near the drill bit, or ahead of the drill bit, and which addresses at least some portion of one or more of the above challenges.

BRIEF DESCRIPTION OF THE DRAWINGS

Referring now to the drawings in more detail, therein are depicted various embodiments demonstrating examples of apparatus in accordance with the present invention.

DETAILED DESCRIPTION OF PREFERRED EMBODIMENTS

The following description refers to the accompanying drawings that depict various details of examples selected to show how the present invention may be practiced. The discussion addresses various examples of the inventive subject matter at least partially in reference to these drawings, and describes the depicted embodiments in sufficient detail to enable those skilled in the art to practice the invention. Many other embodiments may be utilized for practicing the inventive subject matter than the few illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present invention can include a variety of combinations and/or integrations of the embodiments and examples described herein, as well as further embodiments and examples as defined within the scope of all claims based on this disclosure, as well as all legal equivalents of such claims.

As will be described herein, resistivity measurements may be made at the drill bit through use of a bottom hole assembly (BHA), that includes a drill bit having a sensor, such as an electrode, located generally at an exterior surface of the drill bit. In embodiments where the resistivity measurements will be used for geosteering, the drilling assembly will preferably include a geosteering assembly, such as a bent sub or a non-linear drive mechanism, coupled in an operative arrangement with a motor for rotating the drill bit, as is known in the art. Additionally, in order to achieve a desired depth of sensitivity of the resistivity measurements, it will be preferable to have at least one transmitter, such as a toroid antenna, located a predetermined distance from the one or more sensors at the drill bit, such as an electrode or multiple electrodes. In the presently described embodiments, for example, by placing a transmitter toroid antenna supported proximate the upper end of a geosteering assembly, a spacing of approximately 22 feet or more from the drill bit electrode may be obtained.

As will be described herein, there are multiple desirable functionalities that may be incorporated into the bottom hole assembly of the present system. One such desirable functionality is the ability to communicate electrically with structures uphole in the drillstring. The example drill bit design described herein includes an electrical connector that will connect through a conductive cable with a complementary connector above the drill bit, such as proximate the top of the geosteering assembly. This connection can provide communication through the one or more electrical conductor to an upper electrical structure, for example an upper transmitter toroid antenna located proximate the top of the geosteering assembly, as discussed above. Another desirable functionality is an electronics assembly housed within the drill bit, which will preferably be in electrical communication with the releasably engageable electrical connector. The electronics assembly may either be constructed to be disposable with the drill bit, or may be configured for easy removal from the remainder of the drill bit structure after the drill has been used. Finally, another desirable functionality is providing a toroidal antenna, or another antenna configuration, supported proximate the drill bit, and preferably supported directly on the drill bit, within relatively close proximity to the one or more electrodes on the drill bit. For example, it will be preferred to have this toroidal antenna within no more than 36 inches from the bottom-most surface of the drill bit, and preferably within 18 inches of that surface. These and other beneficial functionalities will be discussed further in specific reference to the Figures herein.

Figure 1:
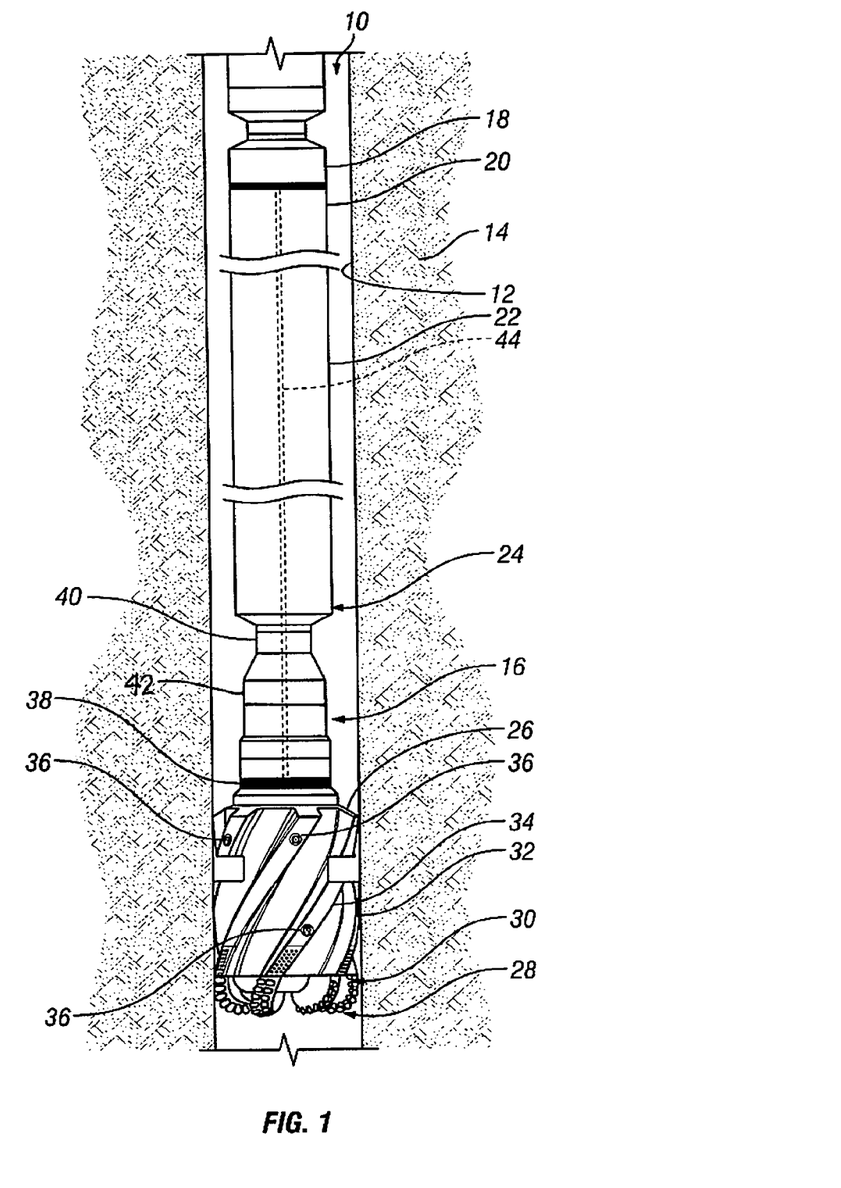
FIG. 1 depicts an example bottom hole assembly as used in a drilling operation, depicted within a wellbore.

Referring now to FIG. 1, the figure depicts a portion of a drilling assembly 10 disposed within a well or borehole 12 extending through an earth formation 14 in a conventional operational environment. Drilling assembly 10 terminates in a bottom hole assembly 16, which includes an earth boring assembly which includes a drill bit 26. In addition to the drill bit, the earth boring assembly may optionally include one or more other devices coupled directly or indirectly to the drill bit, for example a sleeve, a connecting sub (as depicted at 42), or a "piggy-back" stabilizer In some relatively simple embodiments, particularly ones in which geosteering is not used, a bottom hole assembly will include a drill collar, and potentially other structures, coupled above a drill bit assembly, and the drill pipe will engage the bottom hole assembly. However, with many geosteering configurations, the length of the drilling assembly beyond the point of deflection of the drilling axis is a factor to be minimized. Thus, in drilling assemblies intended for use in geosteering applications, the drill bit will often represent the entire bottom hole assembly (and the entire earth boring device), below the geosteering assembly.

For the present illustration, drilling assembly 10 will be described as one suitable for use in geosteering operations, and thus includes a geosteering assembly, indicated generally at 22, with an output drive 40, which is coupled through an optional connecting sub 42 to drill bit 26. Drill bit 26 can also, as noted above, be coupled directly to output drive 40 of geosteering assembly 22. Geosteering assembly can be any desired configuration as known in the art, including bent subs, etc. In most such configurations, the geosteering assembly will be used in conjunction with a downhole motor, and will be coupled (directly or indirectly) to the output or drive shaft of a downhole motor, such as a mud motor 18, above the geosteering assembly. One desirable geosteering assembly will be one such as that marketed by Sperry Drilling Services, a Halliburton company, as the Geo-Pilot® rotary steerable system, wherein the drill bit is driven by an output shaft from the mud motor coupled to (and through) the geosteering assembly, and wherein the shaft is deflected from the longitudinal axis of the tool string between two eccentric bearings, to drive the bit in a desired direction relative to the nominal longitudinal axis of the drilling assembly.

Drilling assembly 10 also supports a first toroid antenna 20. Toroid antenna 20 may be contained in a separate sub, or as will be described herein, may be incorporated into an existing component in drilling assembly 10. In the example embodiment described herein, toroid antenna is incorporated into a tubular member in an upper portion of the described geosteering assembly. As will be described in more detail later herein, the geosteering assembly will also include an internal structure to enable electrical communication between toroid antenna 20 and other components further down in drilling assembly 10.

In this example, the geosteering assembly 22 will couple directly to drill bit assembly 26. For ease of reference, the drill bit assembly 26 will just be referred to herein as "drill bit 26." However, as will be apparent from the discussion below, and particularly the description of FIGS. 2A-B, drill bit 26 is an assembly of components. Drill bit 26 includes a bottom cutting surface (or "bit face") including a plurality of cutting elements indicated generally at 30. Cutting elements 30 are depicted in the example of drill bit 26 as stationary cutting elements such as those formed of polycrystalline diamond (PDC cutting elements). Alternatively, drill bit 26 could have any configuration of cutting elements known in the art, including for example, a plurality of moving cutters, as found on roller cone drill bits.

Additionally, drill bit 26 is depicted as an extended gage bit, formed by a stabilizing section 32 formed of a plurality of spirally-formed blades 34, having a maximum lateral dimension equal to the gage dimension of the drill bit. Drill bit 26 also includes at least one electrode placed in a location to provide reasonably reliable contact (both physical and electrical), with the formation. Thus, such an electrode may be placed at various locations, including proximate the bit face 28 of drill bit 26, such as between rows (or other distributions) of PDC cutting elements 30, or at other locations. In this example, drill bit 26 includes a plurality of electrodes 36, and the electrodes are distributed in longitudinally-offset locations on stabilizer blades 34. In that position, because the stabilizer blades 34 extend to the gage dimension of the bit, the electrodes will be immediately adjacent sidewalls of borehole 12, and typically in contact with those sidewalls during rotation of the drill bit.

As will be described in more detail later herein, in this example embodiment, drill bit 26 also includes a second toroid antenna supported beneath protective coverings, and preferably immediately above the stabilizing section of drill bit 26. Also as will be described in more detail later herein, drill bit 26 includes an internal detachable electrical connection assembly facilitating electrical communication to drill bit 26, including in many embodiments, to second toroid antenna 38 as well as to additional circuitry located within drill bit 26. While placement of toroid antenna 38 on the drill bit is a highly desirable configuration, it will be possible, based on the disclosure herein, to place the second toroid antenna in another component, such as a sub (for example), coupled (directly or indirectly) to the drill bit (again, preferably within 36 inches of the bottom-most surface of the drill bit, and most preferably within 18 inches). In that case, the electrical connection assembly could be supported within the component supporting the second toroid. This electrical connection may be through a single mono-conductor, or may be through multiple conductors. The electrical connection will be described herein as being through a single conductor, flexible cable 44, schematically depicted in phantom in FIG. 1. In FIG. 1, for clarity, flexible cable 44 is depicted as extending through the center of the drilling assembly. As will be apparent to those skilled in the art, where the drilling assembly includes a geosteering assembly with a non-linear longitudinal axis, the cable will not always be centralized along the full length of that geosteering assembly, but will extend linearly therethrough.

Figure 2A:
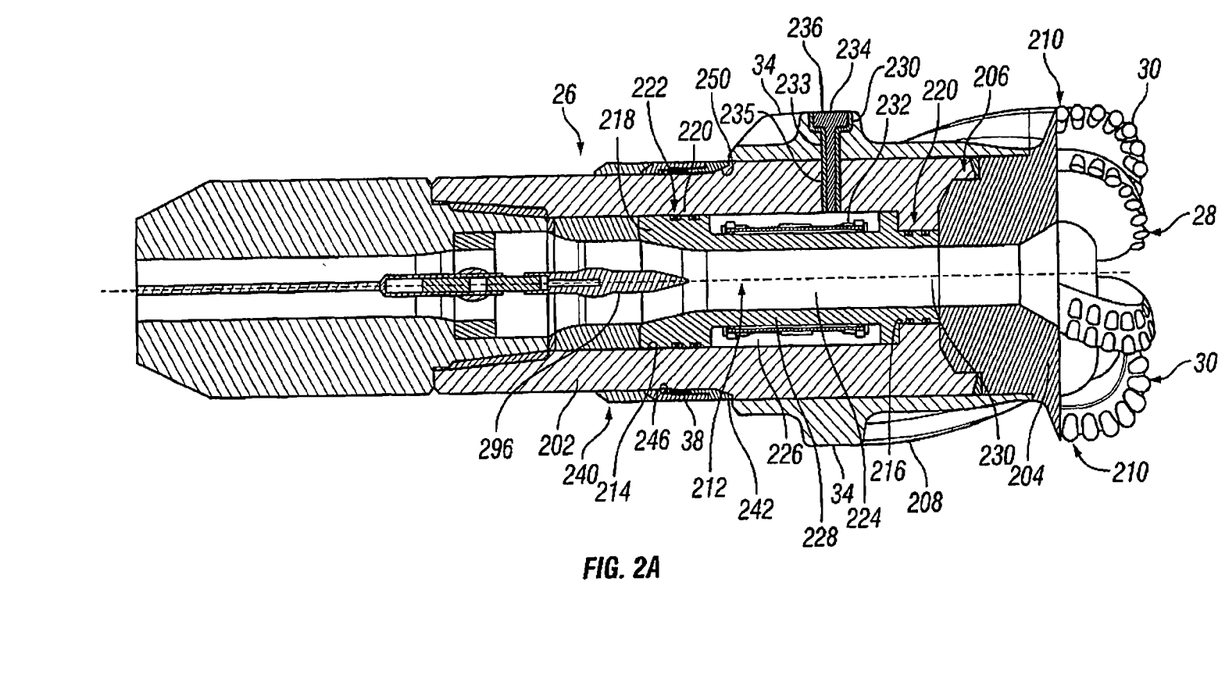
FIGS. 2A-B depict a drill bit assembly of a type similar to that depicted in FIG. 1, depicted substantially in vertical section, with the view of FIG. 2B rotated around the longitudinal axis of the depicted bit, relative to the view of FIG. 2A.
Figure 2B:
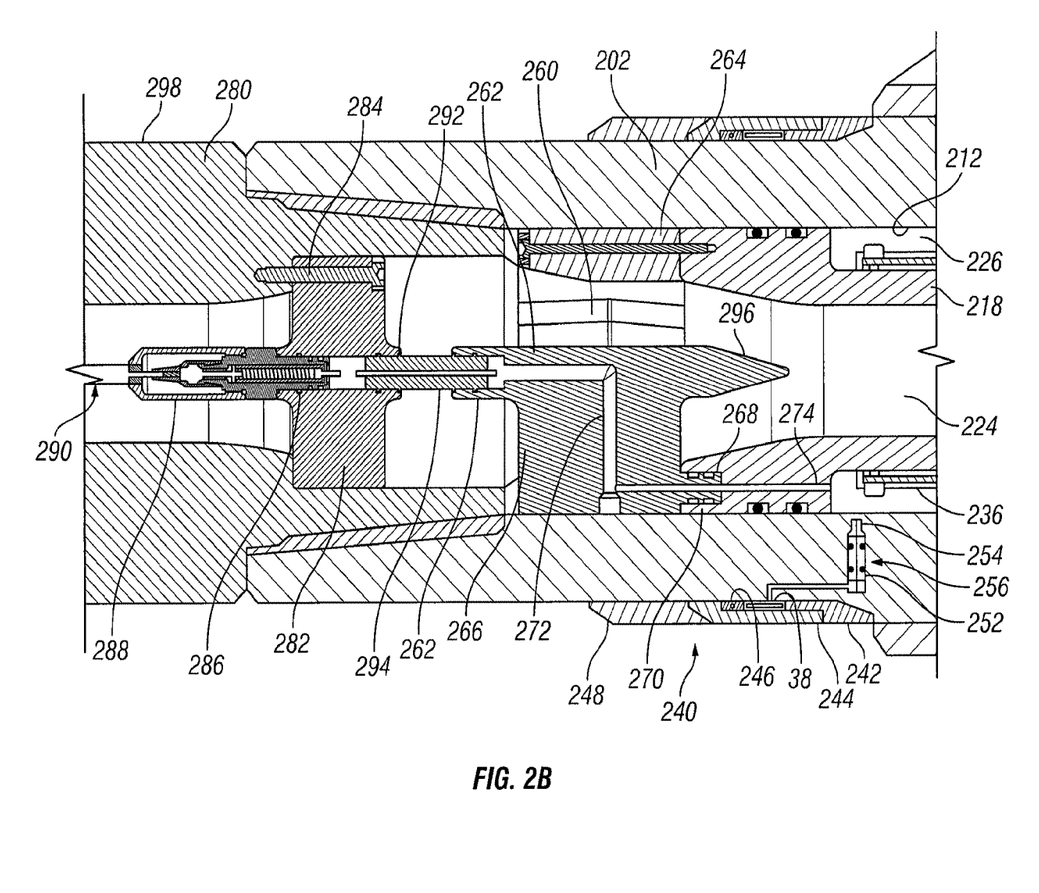

Referring now to FIGS. 2A-B, the figures depict drill bit 26 in greater detail, and partially in vertical section; with the view of FIG. 2B rotated around the longitudinal axis of the depicted drill bit 26, relative to the view of FIG. 2A. Elements depicted in FIGS. 2A-B that were previously identified in the discussion of FIG. 1 have been numbered similarly in FIGS. 2A-B. Drill bit 26 includes a body member (or "bit upper section") 202 which may typically be formed of steel. Drill bit 26 also includes a cutting assembly, illustrated generally at 204, that supports a distribution of cutting elements 30 which will engage and cut the formation. While cutting assembly may be of unitary construction with body member 202, in this embodiment, cutting assembly 204 is a separate assembly that is attached to body member 202 by welding, as depicted at 206. An annular stabilizer sleeve 208 extends generally around body member 202, and further extends to proximate cutting assembly 204 and forms the extended gage of the drill bit. Annular stabilizer sleeve 208 may be formed of steel or of another metal or metallic material, such as a tungsten carbide matrix, as known to those skilled in the art. Annular stabilizer sleeve 208 includes a plurality of spiral stabilizer blades 34 extending to the gage dimension of the drill bit, as established by the surfaces providing the maximum cutting diameter of the drill bit, as generally represented at 210. A stabilizer sleeve with straight, rather than spiral, blades may also be used. However, where the drilling operation will include geosteering, the spiral stabilizer blades are preferred as they will assure consistent support of the drill bit relative to the low side of a non-vertical borehole, and thereby offer improved functionality for both drilling and resistivity measurements. Stabilizer sleeve 208 will also typically be coupled to body member 202 by welding; but in some cases may also be attached by other conventional mechanisms such as being attached by bolts or other insertable devices, as known in the art.

Body member 202 defines a central bore, indicated generally at 212, defined by a sidewall 214 and an inwardly projecting shoulder 216. In this example, a removable insert member 218 extends within central bore 212, and includes a central web portion 228 extending between two surfaces with external sealing assemblies, indicated generally at 220 and 222. Sealing assemblies 220, 222 engage sidewall 214 and inwardly projecting shoulder 216, respectively, to define an annular cavity 226 surrounding web portion 228 of insert member 218. Insert member 218 has a central open passageway 224 that serves as the lower portion of a mud passageway to nozzles proximate the bit face (not illustrated).

Figure 3A:
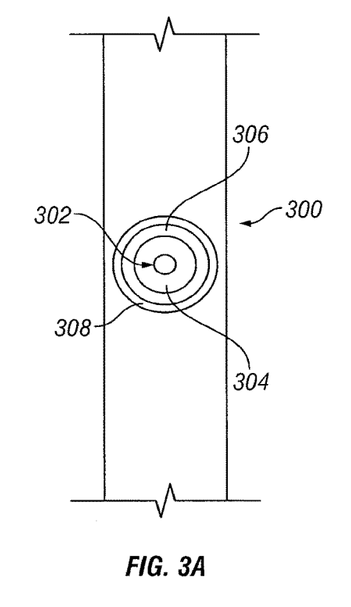
FIGS. 3A-B depict exemplary button electrodes of one type suitable for use with the present invention, depicted in concentric circular form in FIG. 3A, and in concentric oval form in FIG. 3B.
Figure 3B:
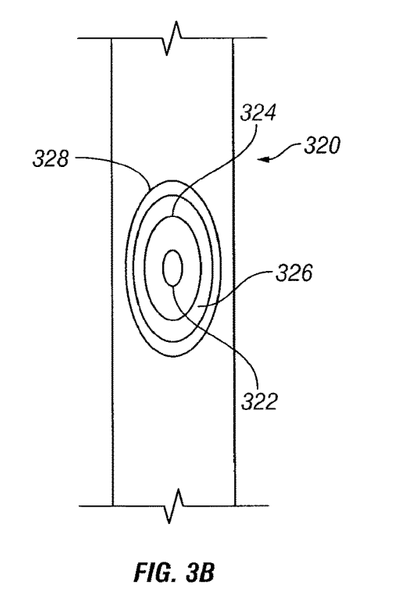

Annular cavity 226 provides a location for housing electronic circuitry, as indicated generally at 232. Drill bit 26 also includes an electrode 234 which is positioned in an aperture 233 in a stabilizer blade 34 (and also an aperture 235 in body member 202), such that the outer electrode surface, at 236, extends proximate the outer contact surface of the stabilizer blade 34. In this example, electrode 234 is depicted as a single button electrode, as opposed to a composite conductor electrode as may be used for a focusing electrode, as generally depicted in FIG. 1. Electrode 234 will be insulated from stabilizer blade 34 and body member 202 by an insulative insert or jacket 230.

Where generally continuous contact with the formation can be expected, then single button electrodes will be preferred, as they will provide the best measurements, particularly for formation imaging. The continuous contact need not necessarily be by a single electrode, but in some configurations may be achieved by having at least one at a time of a plurality of electrodes in contact with the formation. In such configurations, one preferred implementation would include multiple electrodes positioned radially around the drill bit, but at essentially the same longitudinal position on the drill bit. In situations where either the configuration of the drill bit or the formation characteristics are such that it may be expected to be difficult to maintain formation contact with the electrodes, then focusing electrodes will be better suited to drive current to, or receive the current from, the formation. Such focusing electrodes will be discussed in more detail in reference to FIG. 3. In many embodiments, electrode 234 will be coupled to electronic circuitry 232.

As noted in reference to FIG. 1, drill bit 26 also supports a toroid antenna 38. Toroid antenna 38 is supported by a protective mounting assembly indicated generally at 240, and is secured against a shoulder 250 on the outer surface of body member 202. Protective mounting assembly includes a fiberglass insulative ring 242, a protective cover 244, a stop ring 246, and a retention band 248. Fiberglass insulative ring 242 extends generally around body member 202 to provide an insulative support member for mounting the remainder of protective mounting assembly 240. Stop ring 246 serves to help position toroid antenna 38 within the protective mounting assembly. The protective cover will be formed of a non-conductive material, for example of fiberglass of a polyether ether ketone (PEEK), so as to not interfere with the function of toroid antenna 38. This protective mounting assembly is retained in position against stop shoulder 250 by retention band 248. In some preferred implementations, retention band 248 will be a metal or metallic member which is secured in place by heating the member to expand it sufficiently to allow it to be placed in position adjacent the other described components of protective mounting assembly 240, and which will then shrink as it cools to form a secure and tight engagement with body member 202 to secure the described components in the depicted positions.

As shown in FIG. 2B, a passageway 252 extends through body member 202 establishing a path for an electrical conductor 254, as well as appropriate insulative and sealing mechanisms, as depicted by sealing plug 256 having electrical conductors 254 extending therethrough (only a portion of an exemplary conductor is depicted, for clarity). Electrical conductors 254 will facilitate electrical communication between electrical circuitry 236 and toroid antenna 38 through passageway 252.

Also shown in FIG. 2B is a connection block 260 that engages central bore 212 in body member 202 above insert member 218. Connection block 260 includes a generally centrally-located connection fixture 262, coupled to an annular support ring section 264 by a radially-extending arm or web portion 266. Connection fixture 262 is thereby located proximate the center of the flow channel that connects with central open passageway 224. Connection block 260 includes a passageway 272 which extends between connection fixture 262, at a relatively uphole location, and a male connector portion 268, at a relatively downhole location. Male connector portion 268 has a sealing assembly thereon, and cooperatively engages a receiving bore 270 in body member 202, which is coupled by a passageway 274 to annular cavity 226. A passage for one or more electrical conductors is thereby formed extending from connector portion 268 into cavity 226.

As noted previously, drill bit 26 couples to the lower end of geosteering assembly 22. Thus, geosteering assembly includes a mechanism, such as a connection assembly 298 facilitating the establishing of a mechanical and electrical connection with connection fixture 262 in drill bit 26. Connection assembly 298 includes a mandrel 280 that supports a block 282 proximate the lower end of mandrel 280. Block 282 may be retained in position by a suitable mechanism, depicted here as one (of one or more) retention screws 284. Block 282 will include one or more web members to extend radially toward a central location to support mechanical and electrical connectors. These mechanical and electrical connectors include an upwardly accessible connector, such as, for example a threaded coupling, indicated generally at 286, that will cooperatively engage a lower connector 288 of a flexible electrical conductor assembly 290. Block 282 further includes a downwardly accessible connector, such as, again for example, a threaded coupling 292 that will engage a threaded connection fitting 294 which will also threadably engage connection fixture 262. Thus, as a result of the electrical connection provided by connection sub 280, connection fitting 294 and connection sub 261, electrical signals can be conducted between electrical conductor assembly 290 and electronic circuitry 232, and also to and/or from button electrode 234 and toroid antenna 38.

As will be known to those skilled in the art, a central passageway through the drilling assembly, including the above-described components, will convey drilling mud to output nozzles proximate the face of the drill bit, to lubricate and cool the drill bit, as well as to carry cuttings away from the bit face and uphole. Thus, as can be seen from FIGS. 2A-B, the dimensions of the outer boundaries defining central open passageway 224 change to compensate for the area occupied by, for example, connection sub 280 and connection sub 261, so as to maintain a generally uniform cross-sectional area to accommodate the fluid flow. Additionally, a tapered extension 296 can be found on the downstream portion of connection fixture 262 to minimize any turbulence or cavitation that might otherwise be introduced into the mud flow.

The configuration of drill bit 26, and particularly of body member 202, present additional manufacturing considerations compared to more conventional configurations. For example, in addition to the considerations present in the construction of any drill bit body member (or "bit upper section") 202 requires at least one lateral aperture 235 to accommodate some portion of electrode 234, or at least electrical connections to electrode 234. Body member 202 may, of course, require multiple such lateral apertures where multiple electrodes or coils are placed in blades 34 (as depicted at 36, in FIG. 1). Body member also requires a lateral aperture 252 formed to accommodate electrical conductors 254 (within an appropriate sealing plug 256) to communicate with toroid antenna 38. Additional lateral apertures may be required to accommodate insertable fasteners, such as either bolts or pins to secure stabilizer sleeve 208 in position, if welding is not used to secure the sleeve to body member 202. Additionally, manufacturing of body member 202 requires the forming of internal shoulder 216 in central bore 212.

As will be apparent to those skilled in the art, where PDC cutting elements are used for the cutting assembly, the cutting assembly will typically be formed of a matrix as described above. Additionally, it should be recognized that stabilizer sleeve 208 may also be formed either of a machined metal, or of a cast matrix. Where stabilizer sleeve 208 is formed of steel or another metal, the electrode-receiving aperture(s) 233 in one or more blades 34 may be machined through conventional techniques. Similarly, where stabilizer sleeve 208 is to be coupled to body member 202 by insertable fasteners (pins, bolts, etc.), the necessary apertures may again be formed through the conventional machining techniques.

However, where stabilizer sleeve 208 is formed of a cast matrix, the matrix material typically includes tungsten carbide (or another hard material) that is infiltrated by an alloy, for example a copper-based alloy. Components formed of such a matrix are not typically capable of being machined in the same manner as metal components. As a result, where stabilizer sleeve 208 is to be formed of such a matrix material, it is preferred to cast the sleeve. This casting may be done through techniques generally known to those skilled in the art, in which a mold is constructed of an appropriate material (for example, sand, graphite, ceramic, etc.) for use in molding the component. The mold or sub-assembly, or the final part, may also be formed by any of several techniques, including building up through stereo lithography. As another example, "sand printing" may be used, where a mold of the resulting shape is created, and then used as a positive form to create a reverse mold formed of sand in an appropriate resin, that is ultimately hardened in the desired conformity. That reverse mold may then be used to cast the matrix material. Another manufacturing alternative would be to cast the primary shape of stabilizer sleeve 208 in a conventional manner, but to then use non-traditional machining techniques to form the described apertures, and potentially other conformities. An example of one such non-traditional machining technique is electrical discharge machining ("EDM"), where a series of electrical discharges between a tool electrode and the matrix casting (acting as another electrode), typically in the environment of an intervening dielectric liquid (known as "sinker" or "plunge" EDM), causes the incremental removal of material between the electrodes.

Referring now to FIGS. 3A-B, those figures depict two alternative configurations for focusing electrodes as may be used in drill bit 26, in place of the single element button electrode 234 depicted in FIG. 2A. FIG. 3A depicts a first focusing electrode configuration 300, having a central electrode 302 surrounded by an insulator 304. Central electrode 302 has a generally cylindrical shape (viewed from the exterior), and thus insulator 304 and subsequent structures in focusing electrode 304 are concentric annular structures relative to central electrode 302. Extending around insulator 304 is a focusing electrode 306, again surrounded by a second insulator 308. Similarly, the second focusing electrode configuration 320 of FIG. 3B depicts a central electrode 322 surrounded by a first insulator 324 which was then surrounded by a focusing electrode 326 and a second insulator 328. As known to those skilled in the art, a current applied to either of the focusing electrodes 306, 326, and any current induced in the respective supporting structure (here, a portion of a stabilizing section blade 34) will serve to focus the measurement current applied to (or received from) the central electrode 302, 322 to extend more deeply into the surrounding formation.

Figure 4:
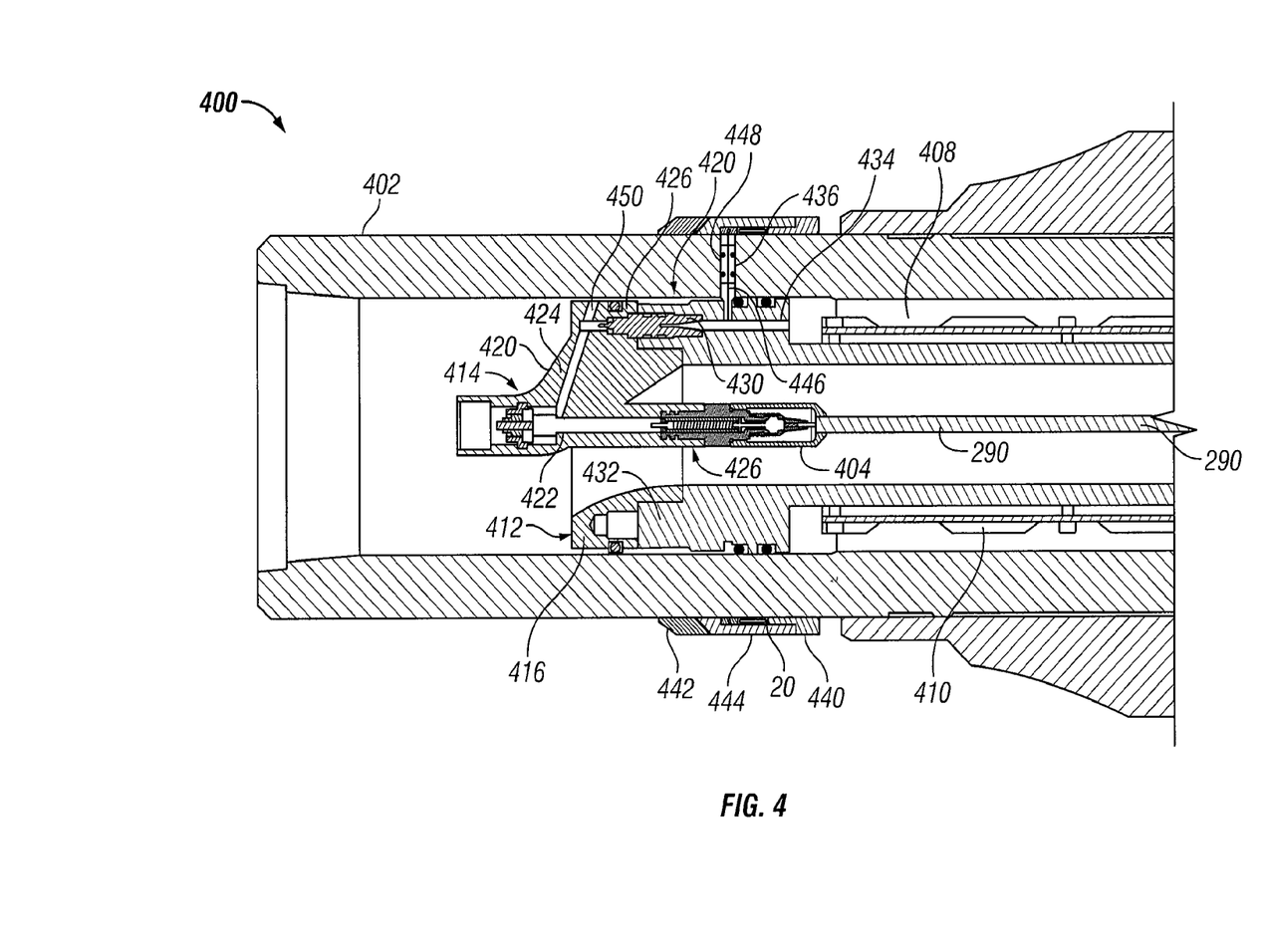
FIG. 4 depicts an upper portion of a geosteering assembly as may be used in the drilling assembly of FIG. 1.

Referring now to FIG. 4, the figure depicts an upper portion 400 of geosteering assembly 22, as identified in FIG. 1, illustrated in vertical section. As noted previously, in this example, toroid antenna 20 is supported by the geosteering assembly. As an alternative, toroid antenna could be coupled to a separate sub interposed in drilling assembly 10, between the downhole motor and geosteering assembly 22. Because many different configurations of geosteering assemblies are suitable for use with the described drilling assemblies, the specific configuration of the geosteering assembly will not be addressed here, other than to address one example of adaptations that may be made in a geosteering assembly to facilitate electric communication through the assembly. As an alternative to enabling those communications through use of a flexible conductor cable (44 in FIG. 1) as discussed herein, other structures may be utilized. As just one example, in systems configured for use with wired pipe, which will communicate signals through conductors in the drillstring components, that same structure of conductors might also be used to provide the desired electrical communication through the necessary components in the drill string, including the geosteering assembly. In this adaptation of the geosteering assembly, structures are provided to engage an upper connector 404 of flexible electrical conductor assembly 290 which will allow electrical communication from the top of the geosteering assembly (including toroid antenna 20) with toroid antenna 38 and electronic circuitry 232 in drill bit 26, as previously described.

Upper portion 400 of geosteering assembly 22 includes a mandrel 402 that couples to an output shaft of a downhole motor for rotation with the shaft, and further includes a central assembly, indicated generally at 406, that will rotate with mandrel 402. In the depicted system, mandrel 402 and central assembly 406 cooperatively form an upper drive portion of the geosteering drive mechanism that will couple to drill bit 26. Mandrel 402 and central assembly 406 cooperatively define an annular recess 408 that houses electronic circuitry 410 associated with operation of the geosteering assembly. Central assembly 406 also includes an upper connection block 412 with a connector 414 configured to engage a complimentary connector from the downhole motor (not depicted), and to facilitate electrical communication from the downhole motor (and above it) with the electronic circuitry 410 in geosteering assembly 22, as well as the electronic circuitry 232 and toroid antenna 38 of drill bit 26 (see FIG. 2A).

Connection block 412 includes an annular portion 416 that engages a shoulder 418 on an end portion 432 of central assembly 406, and that sealingly engages the interior of mandrel 202. A web portion 420 extends radially inwardly from annular portion 416 to support connector 414 in a central portion of mandrel 402. Connector 414 is positioned both radially and longitudinally to engage the complementary connector on the mud motor (or any intervening components) when the tools are threaded together, so as to establish electric communication with the uphole structures. Connection block 412 also includes first and second passageways, 422 and 424, respectively. First passageway 422 extends between connector 414 and a second connector 426 that is also preferably centrally-oriented within mandrel 402. In some embodiments, connector 414 and connector 426 will each be aligned along the longitudinal axis of mandrel 402 as that axis exists proximate the connectors. Second connector 426 is configured to mechanically and electrically engage upper connector 404 of flexible electrical conductor assembly 290. As will be appreciated by those skilled in the art, the exact structure of upper connector 414 and its complimentary connector on the downhole motor (not depicted) and also of connector 426 and its engaging connector 404 may be of any suitable configuration as known in the art, such as two assemblies which may be threadably joined, to establish mechanical engagement and to allow the engagement or other contact of electrical conductors to achieve the indicated electrical connections.

Passage 424 extends to electrical connector 420, which includes a first connector member 428 in connection block 412, and an engaging connector member 430 supported by end portion 432 of central assembly 406. For the avoidance of doubt, certain passages as described and depicted herein (for example passage 424), consist of multiple bores, and are depicted to indicate the manner in which those bores might be actually constructed. As will be apparent to those skilled in the art, once the identified bores are formed, then undesired openings (for example, as indicated at 450) resulting from the machining operations will be closed by a plug or other appropriate structure, as is well known in the art. Engaging connector member 430 is in communication with a passage 434 in communication with annular recess 408. Additionally, passage 434 extends radially to the exterior of end portion 432 to an opening between sealing assemblies which is aligned with a radial passage 436 extending proximate the mounting location of toroidal antenna 20. Thus, passage 424, electrical connector 426 and passage 436 facilitate such electrical communication as may be desired between toroidal antenna 20, electronic circuitry 410, connector 414, and connector 426; and from connector 426, through electrical conductor assembly 290, to bit 26.

Toroidal antenna 20 may be coupled to the exterior of mandrel 402 by a variety of appropriate mechanisms. For example, toroidal antenna 20 and its associated components might be housed at least partially within a recess, or against a shoulder, formed in the exterior of mandrel 402, as was depicted and described relative to the mounting of toroidal antenna 38 on drill bit 26. As a depicted example of an alternative configuration, toroidal antenna 20 is not housed within a recess, but is retained on the surface of mandrel 402 between two retention bands, at 440 and 442. As discussed relative to bit 26, each of retention bands 440, 442 may be a heat-expandable band that, when cooled, shrinks to securely engage the exterior of mandrel 402. As with toroidal antenna 38, a non-conductive protective member 444, such as may be formed of either fiberglass or PEEK, will extend over antenna 20 and protect it from the exterior environment. Additional components (insulators, spacers, etc.), may be added as needed for a specific implementation. To facilitate the above-described electrical connection between toroidal antenna 20 and the other components, electrical conductors 446 will be sealingly retained within passage 436 by extending through a sealing plug 448.

Figure 5:
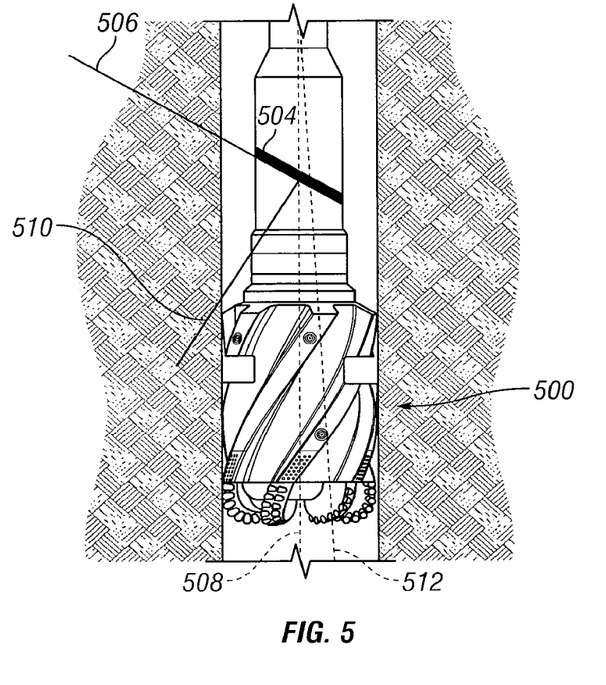
FIG. 5 depicts an alternative configuration for a drill bit as may be used in a drilling assembly such as that of FIG. 1.

Referring now to FIG. 5, therein is depicted an alternative configuration for a drill bit 500 suitable for use in a drilling assembly as described above in reference to FIG. 1. Drill bit 500 may be constructed essentially identically to previously-described drill bit 26, except that rather than a toroid antenna 38 extending in a plane which is essentially perpendicular to the longitudinal axis through the drill bit, drill bit 500 includes a conventional coil antenna 504 that extends around the drill bit in a plane 506 that is angled relative to the longitudinal axis 508 through drill bit 500. Coil antenna 504 thereby provides a magnetic moment 510 that is not aligned with the longitudinal axis 508 of drill bit 500. In some anticipated configurations, coil antenna 504 may be disposed at an angle of approximately 45° relative to the axis through drill bit 500. However, many other alternative angles of the plane of the antenna may be contemplated, falling between perpendicular (as with toroid antenna 38) and greater than 0° (i.e., an angle of greater than 0 degrees, and no greater than 90 degrees). In many configurations, an angle between approximately 20 degrees and 70 degrees will be used. It is anticipated that the establishing of a magnetic moment at the drill bit which is not aligned with the axis of the drill bit should provide the capability to evaluate resistivity of the formations that the bit has not yet penetrated, i.e. ahead of the drilling surface of the drill bit. One additional relationship that should be noted is that because the drilling assembly of FIG. 1 includes a drill bit that is deflected from the longitudinal axis of the drilling assembly (see axis 512 in FIG. 5; the deflection angle has been exaggerated for clarity of the illustration), even a coil antenna lying perpendicular to the axis of the drill bit (as with toroid antenna 38), with a magnetic moment aligned with the axis of the drill bit, will have a magnetic moment disposed at an angle to the longitudinal axis of the drilling assembly. Where the coil antenna is disposed at an angle to the drill bit axis 506, as depicted in FIG. 5, the antenna will also be located at an angle to the axis to the drilling assembly 512, though at a different angle.

In operation, when drilling assembly 10 is used in a drilling operation, the described components may be used to determine resistivity at the bit. In many operations this will include imaging of the formations surrounding the well bore, and evaluating the presence of bed boundaries to be used in geosteering of the drilling operation. To obtain the needed resistivity measurements, toroid antennas 20 and 38 will be selectively actuated to induce current in the drill string and in the drill bit. That induced current, after passing through the formation, will be sensed through use the receivers directly on the drill bit, toroid antenna 38, or electrode(s) (as indicated at 36 in FIG. 1, or 234 in FIG. 2). In most operations, particularly those including a conductive mud environment (typically, where water-based muds are used), the toroidal antennas will be alternately energized at frequencies between 1 kHz and 20 kHz. While toroid antenna 20 will typically be used primarily, or exclusively, as a transmitter, toroid antenna 38 at the bit will, in some embodiments, be used as both a transmitter and receiver. For example, Toroid antenna 20 will be used as a transmitter, and the resulting current will be received at Toroid antenna 38. At other times, toroid antenna 38 will be used as a transmitter, and the current induced in the formation will be received at the described button electrode(s). That measurement may be used, for example, for imaging the formations at the bit. As will be apparent to those skilled in the art, although this discussion addresses one likely configuration, wherein toroid antennas 20 and 38 are each used as transmitters, and the electrodes 36 are used as receivers, those functions conceptually could also be reversed between those components. Additionally, one or more button electrodes in the bit might also be used as a transmitter and thus appropriately energized; with the resulting current sensed by one or more spaced electrodes on the drill bit. In that circumstance, the transmitter electrode would preferably be longitudinally offset from the receiving electrodes (such longitudinal offset between button electrodes is described in reference to FIG. 1). Such longitudinally offset electrodes may be used for measurements that are useful for depth correction. For example, separate images resulting from current received at two longitudinally offset electrodes may be compared to one another, and correlated in a desired manner to determine any needed depth correction. Additionally, button electrodes might each be replaced by a respective small coil antenna disposed in a stabilizing blade 34, as an alternative structure for use in place of a button electrode. The detected currents will be measured and processed in a conventional manner to yield formation resistivity measurements, potentially including images of the formation, proximate the drill bit. In the example of FIG. 5, when an angled coil antenna 504 is located on the drill bit, it will typically be used only in a receiver mode, with the toroid antenna 20 being used as the transmitter.

The advantages of this system include the ability to evaluate the formation right at the bit. While useful for many reasons, is particularly desirable in geosteering applications where an appropriate course may be confirmed and/or corrected, as needed based on essentially real-time information regarding the formations through which the bit is extending. In other applications, such as where relatively nonconductive drilling muds are utilized, typically oil-based muds, it may be desirable to operate the transmitters at much higher frequencies, in the megahertz range, to make the desired formation measurements.

Many modifications and variations may be made in the techniques and structures described and illustrated herein without departing from the spirit and scope of the present invention. Accordingly, it should be clearly understood that the scope of the inventive subject matter. Is defined only by the claims and their equivalents that are supported by this specification.

What is claimed is:

1. A drilling assembly, comprising:
   a first tubular member supporting a first transmitter antenna;
   a steering assembly located beneath the first tubular member;
   an earth boring device comprising a drill bit, the drill bit having a body member, a bottommost surface and a gage surface at a stabilizing section of the drill bit, and wherein the earth boring device is supported beneath the steering assembly, and comprises,
      a second transmitter/receiver antenna supported in spaced relation to the first transmitter antenna, and
      at least one focusing electrode at the gage surface and disposed within an aperture in the stabilizing section of the drill bit, wherein the at least one focusing electrode comprises a center electrode concentrically adjacent to an insulator ring, wherein the insulator ring is concentrically adjacent to an electrode ring; and
   a releasable electrical connection assembly within the drill bit, the releasable electrical connection assembly including at least one electrical conductor coupled to the at least one focusing electrode and including a connection fixture configured to engage an electrically conducting member extending to the drill bit when the drill bit is coupled in a drilling assembly.

2. The drilling assembly of claim 1, wherein the second transmitter/receiver antenna is supported by the drill bit.

3. The drilling assembly of claim 1, wherein the earth boring device further comprises at least one device selected from the group consisting essentially of a sleeve, a connection sub and a stabilizer, the device coupled to the drill bit.

4. The drilling assembly of claim 3, wherein the second transmitter/receiver antenna is supported by the device.

5. The drilling assembly of claim 1, wherein the first transmitter antenna is a toroid antenna.

6. The drilling assembly of claim 1, wherein the second transmitter/receiver antenna is a toroid antenna.

7. The drilling assembly of claim 6, wherein the second transmitter/receiver antenna extends around a portion of the drill bit.

8. The drilling assembly of claim 1, wherein the at least one electrode comprises a plurality of electrodes.

9. The drilling assembly of claim 8, wherein electrodes of the plurality of electrodes are distributed radially around the drill bit, and are in at least two longitudinally spaced locations on the drill bit.

10. The drilling assembly of claim 8, wherein the longitudinally spaced electrodes are distributed radially around the drill bit at a same longitudinal point.

11. The drilling assembly of claim 1, further comprising:
a releasable connection assembly configured to electrically engage electronic circuitry in the drill bit when the drill bit is coupled to the steering assembly.

12. The drilling assembly of claim 1, wherein the second transmitter/receiver antenna is positioned within 36 inches of the bottommost surface of the drill bit.

\* \* \* \* \*